(12) United States Patent
Omoigui (10) Patent No.: US 6,694,352 B1
(45) Date of Patent: Feb. 17, 2004

(54) METHODS AND SYSTEMS FOR NOTIFYING CLIENTS CONCERNING LIVE ELECTRONIC PRESENTATIONS

(75) Inventor: Nosakhare D. Omoigui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/465,533

(22) Filed: Dec. 16, 1999

(51) Int. Cl.[7] .......................... G06F 9/00; G06F 15/173
(52) U.S. Cl. ........................ 709/205; 709/205; 709/223
(58) Field of Search .................... 709/200, 204, 709/205, 223, 244

(56) References Cited

U.S. PATENT DOCUMENTS

| | | | | |
|---|---|---|---|---|
| 5,613,032 A | * | 3/1997 | Cruz et al. | 386/69 |
| 5,644,715 A | * | 7/1997 | Baugher | 709/228 |
| 5,654,886 A | * | 8/1997 | Zereski et al. | 702/3 |
| 5,793,438 A | * | 8/1998 | Bedard | 725/43 |
| 5,930,473 A | * | 7/1999 | Teng et al. | 709/204 |
| 5,996,015 A | * | 11/1999 | Day et al. | 709/226 |
| 6,157,401 A | * | 12/2000 | Wiryaman | 348/14.09 |
| 6,195,093 B1 | * | 2/2001 | Nelson et al. | 345/732 |
| 6,279,040 B1 | * | 8/2001 | Ma et al. | 709/231 |
| 6,292,825 B1 | * | 9/2001 | Chang et al. | 709/206 |
| 6,359,557 B2 | * | 3/2002 | Bilder | 340/531 |
| 6,366,933 B1 | * | 4/2002 | Ball et al. | 707/511 |
| 6,466,252 B1 | * | 10/2002 | Miyazaki | 348/14.08 |
| 6,466,969 B1 | * | 10/2002 | Bunney et al. | 709/206 |
| 6,487,599 B1 | * | 11/2002 | Smith et al. | 709/229 |
| 6,594,682 B2 | * | 7/2003 | Peterson et al. | 709/102 |
| 2001/0039568 A1 | * | 11/2001 | Murray et al. | 709/204 |
| 2002/0056013 A1 | * | 5/2002 | Couturier et al. | 709/318 |

\* cited by examiner

*Primary Examiner*—Krisna Lim
(74) *Attorney, Agent, or Firm*—Lee & Hayes, PLLC (57) ABSTRACT

Methods and systems for enabling users to register for notifications pertaining to electronic presentations of interest are described. The inventive methods and systems enable users to monitor many different electronic presentations without physically connecting to them for continuous play. Users can opt to monitor for the occurrence of an electronic presentation itself, or for events that might occur within various electronic presentations. The events can be monitored live through the use of meta information that is generated as the electronic broadcast is about to be, or is being broadcast. The meta information can be generated manually or automatically.

62 Claims, 7 Drawing Sheets

| Client ID | Title | Subject | Descriptive Information |
|---|---|---|---|
| 1 | MS Company Meeting | | Steve Ballmer talking |
| 2 | Seahawks game | | first downs, touchdowns, halftime, end |
| 3 | | Beluga whales | |
| 4 | MTV Countdown | | Number 1 and 2 songs only |

| Name/Title | Source | Topic | Descriptive Information |
|---|---|---|---|
| MS Company meeting | A | Windows | Bill Gates talking |
| Wild Planet | B | Lions | migration habits, hunting |
| AL Championship game | C | | bottom of 8th, John Valentin at bat |
| MTV Countdown | D | | Number 6 song, Madonna |

| | Now | Rec. | Future | Reg. | | |
|---|---|---|---|---|---|---|
| | Title | | Events | | | Images |
| | Wild Planet | | Lions, migration habits | | | |
| | MTV Countdown | | No. 6 song, Madonna | | | |
| | | | | | | |

METHODS AND SYSTEMS FOR NOTIFYING CLIENTS CONCERNING LIVE ELECTRONIC PRESENTATIONS

TECHNICAL FIELD

The present invention relates to interactive entertainment systems, such as interactive television or interactive computing network systems, and to electronic program guides which operate in conjunction with these systems. In particular, the invention relates to methods and systems for notifying clients concerning electronic presentations that are being or are about to be broadcast.

BACKGROUND

Television viewers are very familiar with printed programming schedules that appear in daily newspapers or weekly magazines, such as TV Guide®. The printed program guide lists the various television shows in relation to their scheduled viewing time on a day-to-day basis.

Cable TV systems often include a channel with a video broadcast of the printed program guide. The cable channel is dedicated to displaying listings of programs available on the different available channels. The listings are commonly arranged in a grid. Each column of the grid represents a particular time slot, such as 4:00 p.m. to 4:30 p.m. Each row represents a particular broadcast or cable channel, such as ABC, PBS, or ESPN. The various scheduled programs or shows are arranged within the rows and columns, indicating the channels and times at which they can be found. The grid is continuously scrolled vertically so that a viewer can scan a continuously refreshing set of programs within three or four time slots.

Newer, interactive cable distribution systems feature electronic program guides (EPGs) which function somewhat similar to the broadcast program listing channels described above. Rather than scrolling automatically, however, an EPG allows a viewer to use a remote control device to scroll as desired both horizontally and vertically through a program grid. This functionality utilizes the two-way communications capabilities of interactive cable systems.

The EPG is typically implemented in software which runs on a set-top box (STB) connected between a TV and a cable system home entry line. When scrolling to a new column or row, the set-top box inserts the appropriate programming information into each new row or column. This information is either cached at the STB, or requested from the cable system's head-end.

Printed programming schedules, video broadcasts of programming schedules and EPGs all suffer a drawback in that a user who is interested in viewing a particular program must be diligent in monitoring for the program of interest so that they do not miss it. For example, a user must physically review printed or broadcast programming schedules, as well as EPGs in order to find a particular program of interest and the time when it is going to be broadcast. They must then be diligent in remembering when the show is being broadcast so that they can view it. Typically, and because programming guides change regularly (e.g. weekly or monthly), users must continuously consult the new programming guides to see what shows have been scheduled for subsequent time periods. Having to regularly and diligently consult programming guides can be inconvenient for users and can take them away from activities where their time might be more productively spent.

This problem is not, however, confined to the world of television. Specifically, there are other media over which "programs" of interest or, more broadly, "electronic presentations" are broadcast. For example, electronic presentations can be broadcast over a network such as the Internet and viewed on client viewing devices such as personal computers. An example of such an electronic presentation includes, without limitation, streaming multimedia broadcasts (e.g. audio, video, graphical, etc.). With a wide variety of sources of electronic presentations, it can become a daunting task for a user to sift through all of the potential presentations to find the ones that they want to view. In addition, many times a user will want only to view certain events within a particular presentation and not the whole presentation itself. Yet, in order to view the events of interest, a user must typically monitor the entire presentation or at least a large portion of it. For example, a user might only be interested, when watching a football game, in viewing third downs, touchdowns, half time and end-of-game shows. As another example, a user might be interested in a particular streaming multimedia conference of CEOs of high tech companies, but may only want to hear Bill Gates speak. If the user does not know specifically when Bill Gates is to speak, then they may have to watch a good portion of the presentation. As can be appreciated, having to watch an entire presentation in order to view only those portions of particular interest is wasteful.

Accordingly, this invention arose out of concerns associated with improving the user experience insofar as being able to efficiently select and view one or more electronic presentations.

SUMMARY

Methods and systems for enabling users to register for notifications pertaining to electronic presentations of interest are described. The inventive methods and systems enable users to monitor many different electronic presentations without physically connecting to them for continuous play. Users can opt to monitor for the occurrence of an electronic presentation itself, or for events that might occur within various electronic presentations. The events can be monitored live through the use of meta information that is generated as the electronic broadcast is about to be, or is being broadcast. The meta information can be generated manually or automatically.

In one aspect, one or more notification servers are provided that link various sources of electronic presentations and client processing devices that are operated by users. The notification server(s) manages one or more databases. The databases are used to maintain and update user information that describes electronic presentations that may be of particular interest to a user, as well as source information (meta information) that describes aspects of the electronic presentation that the source is broadcasting. The meta information can be received fairly continuously throughout the broadcast of a presentation so that the source information that is maintained by the notification server can be updated. An analysis/search engine uses the source information to search the user information to identify users that have registered for notifications related to the current source information. If a user is found to have registered for a notification associated with the current source information, the notification server generates and sends such a notification. The user, once notified, can opt to connect directly to the source of the electronic presentation so that they can receive a continuous feed of the presentation.

The user information that is registered with the notification server can include many different types of data including topical data that can describe topics of interest, key word data that describes key words of interest, and names of particular individuals to name just a few. Thus, a user is not required to register for notifications based only upon the name of a particular presentation.

Other aspects of the invention include unique user interfaces that enable users to both register for the notifications and track the electronic presentations that are currently being monitored by the notification server.

DETAILED DESCRIPTION

Exemplary Network Structure

Principles of the invention described below can be implemented in connection with any suitable network that can enable source and user information to be collected and processed as described below. It is to be appreciated that the described embodiment constitutes but one example and is not intended to limit the invention to the specifically illustrated architecture.

Figure 1:
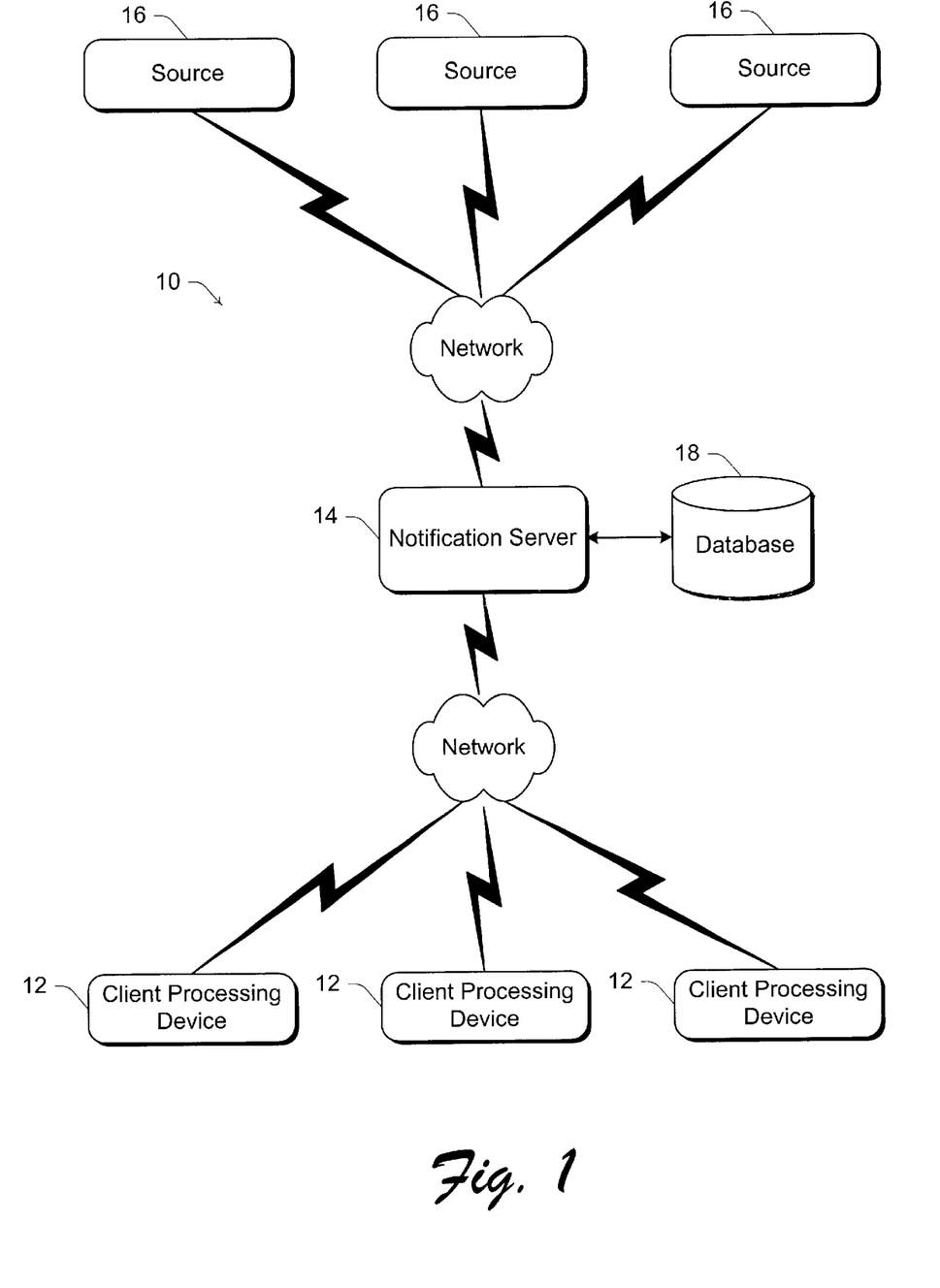
FIG. 1 is a diagram that illustrates a network system and environment in accordance with one embodiment of the invention.

FIG. 1 shows a network system 10 in the form of a client/server system in accordance with one embodiment of the invention. Generally, system 10 includes one or more client processing devices 12 that are used by users or viewers, one or more notification servers 14, and one or more sources 16 of electronic presentations. The client processing devices 12, notification servers 14, and source 16 communicate with each other over a data communications network. The illustrated communications network is a public network such as the Internet. The data communications network can also include local-area networks and/or private wide-area networks, and can include both wired and wireless sections. Client processing devices 12, server 14, and sources 16 can communicate with one another via any of a wide variety of known protocols.

In the context of this document, the terms "client" and "client processing device" are intended to include, without limitation, any form of television set, enhanced television set (e.g. interactive TV or set-top box), computer or personal computer, or any other type of computing device such as a hand-held machine. The term "user" refers to an individual or entity that uses a client processing device. The term "source" is intended to include, without limitation, any source that can produce an electronic presentation that can be run or viewed on any of the exemplary client processing devices. In addition, the term "electronic presentation" is intended to include any and all types of electronic presentations that are capable of being run or displayed on the exemplary client processing devices described above. Some examples include, among others, television programs, multimedia streaming presentations, and the like.

Client processing devices 12 are configured to generate user information that is provided by a user. The user information gives an indication of electronic presentations that might be of particular interest to a particular user. The user information might also be gathered by consulting a database that contains user information such as user occupation, client processing device location, and the like. The user information can include a wide variety of information such as the titles or names of particular electronic presentations, as well as key words or subjects that might be of interest to a particular user. For example, a user on a client device might be interested in viewing any electronic presentations that discuss or are related to Bill Gates. In this instance the user information might just include "Bill Gates" as a subject. The user might alternately be interested in electronic presentations that deal only with Beluga whales. In this instance the user information might include "Beluga whales" as a subject. Alternately, and in the case of passively gathered user information (that is, user information that is not directly input by a user for the purpose of determining desirable electronic presentations), there might be a database that contains information about various users or client device locations. For example, a user might be a software developer and might be interested in electronic presentations having to do with developer conferences. Further, it might be known that a certain client device is located in the Green Bay Wisconsin area. In that case, the user of the client device might be interested in receiving notifications about Packer games. The user information, whether provided by the user or ascertained about the user, is collected and managed by notification server 14 in one or more databases 18.

As sources 16 are about to begin broadcasting, or during broadcasting of their particular electronic presentations, source information about the respective electronic presentations is sent to and received by the notification server 14. The source information is preferably not the actual continuous play broadcast of the presentation, but rather describes one or more aspects of a particular "live" electronic presentation. This source information can be maintained in database 18 and used as the basis of a search of all of the registered user information. The notification server 14 evaluates the source information against the user information and generates a notification when it appears that an electronic presentation includes information of interest to a user. In the described embodiment, the source information includes so-called meta information which is essentially any type of information that relates to a particular electronic presentation. Meta information can have many forms. For example, meta information can include the title or name of a presentation and statements about the content of the presentation. Meta information can also include audio, visual, graphic or other types of information that can be derived from an electronic presentation. For example, scene changes in a particular electronic presentation can be detected and rendered into meta information that conveys the fact that a scene has changed. The meta information can also include captured images of the electronic broadcasts themselves. Other examples of meta information are given below. The meta information can be rendered or generated manually or automatically. In the manual case, an individual might observe a broadcast and type information about the broadcast into an encoder (e.g. "Bill Gates is speaking"). Alternately, various devices can be used to automatically collect meta information, e.g. screen-capturing software might intermittently capture images of a presentation and provide them to the server 14 for display for users who have registered for them.

In the described embodiment, notification server 14 receives both the user and the source information and, if appropriate, places it into a database 18. For example, in many instances it will be advantageous to place the source information in the database. In other instances, source information might just be cached during searching. From there, the notification server 14 is able to evaluate the source information and the user information and ascertain whether any of the users need to be notified about electronic presentations for which they have registered. An exemplary notification server and database are described in more detail in connection with FIG. 3 below.

Exemplary Computer System

Figure 2:
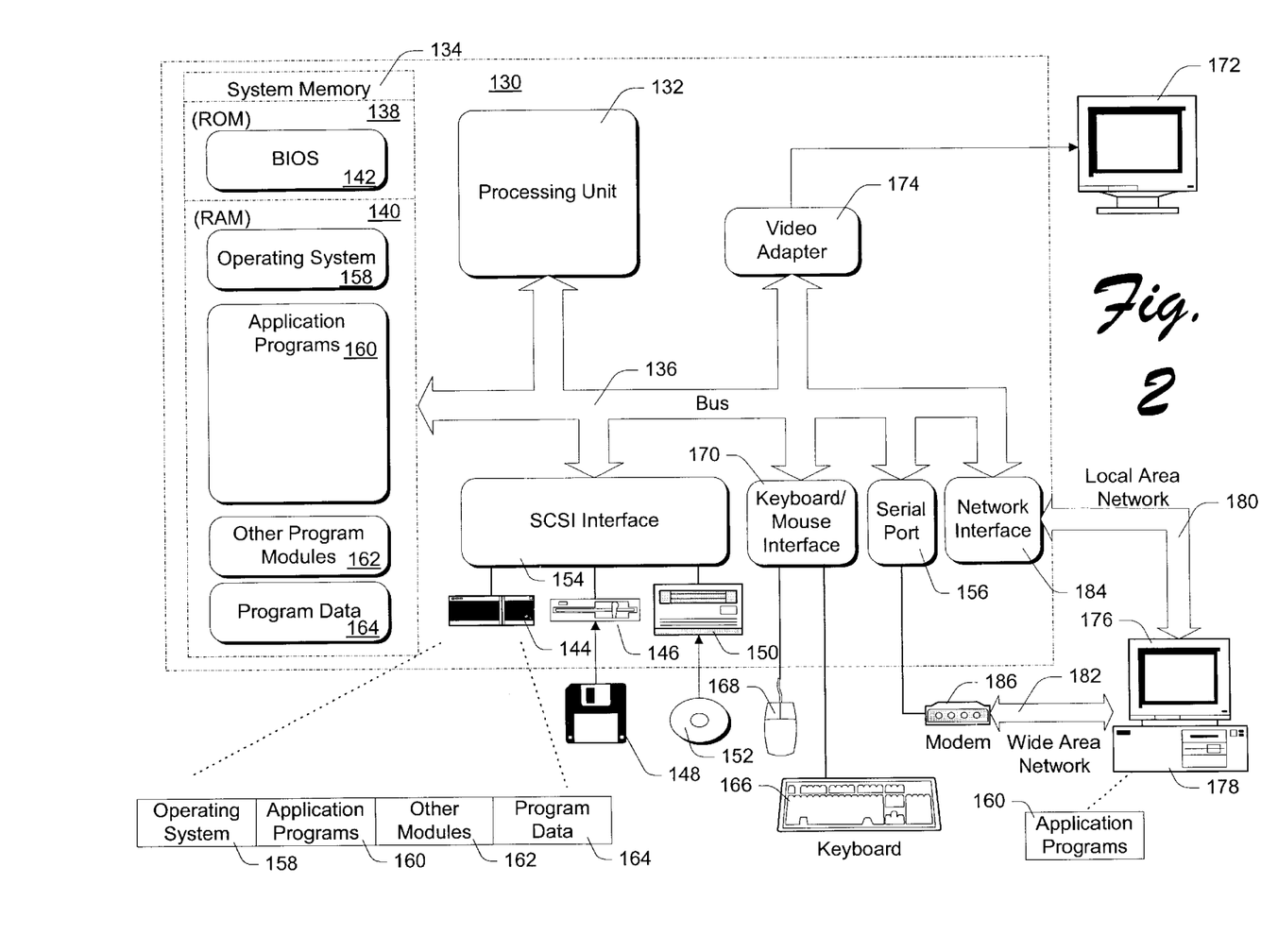
FIG. 2 shows a general example of a computer that can be used in implementation of one or more embodiments of the invention.

Preliminarily, FIG. 2 shows a general example of a computer 130 that can be used in accordance with the invention. The computer, or aspects thereof, can be used to implement the sources, notification servers and the client processing devices.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Encoders and Notification Server

Figure 3:
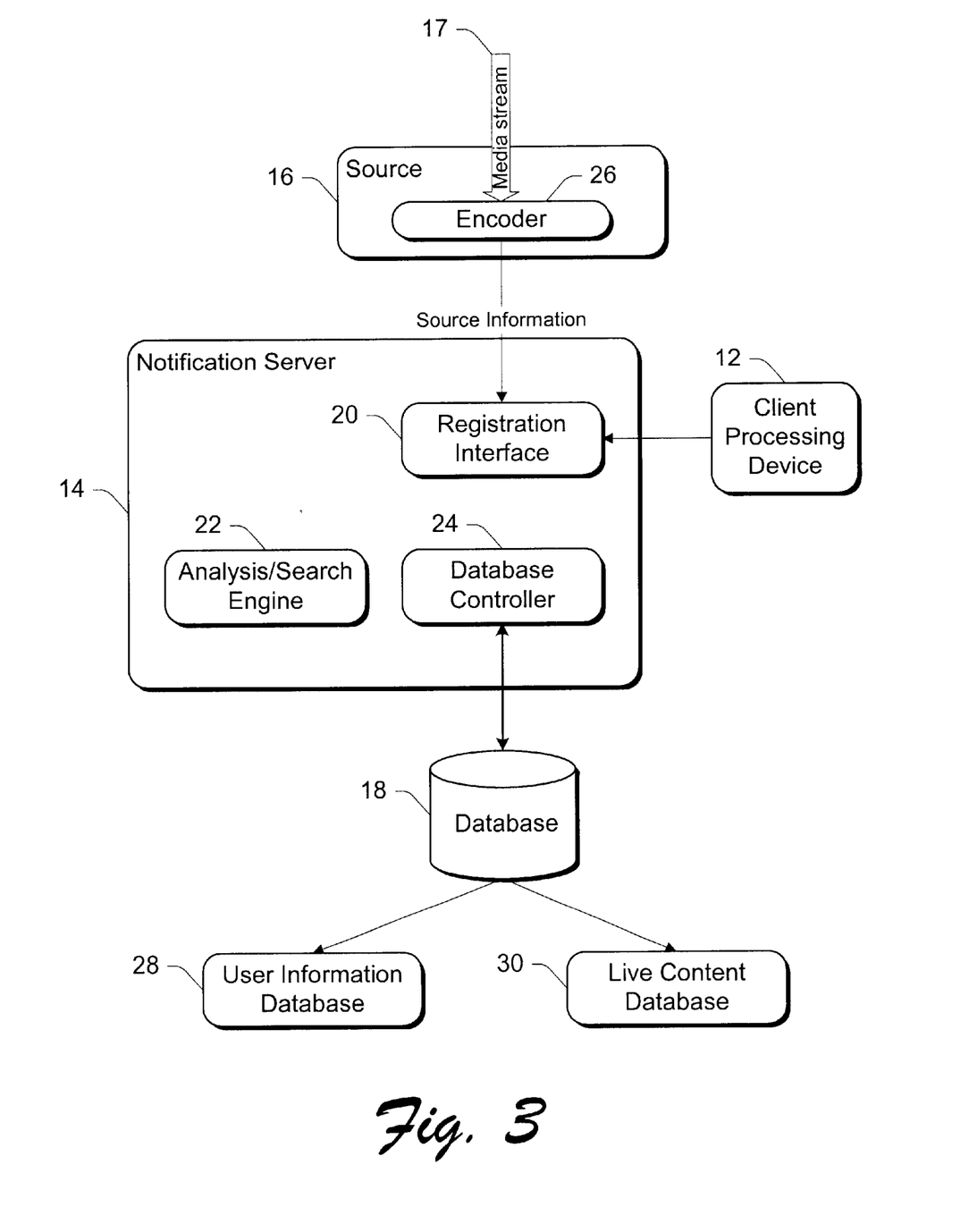
FIG. 3 is a block diagram of an exemplary notification server, source and database in more detail.

FIG. 3 shows an exemplary notification server 14, source 16, and database 18 in more detail. Notification server 14 includes one or more registration interfaces 20, an analysis/search engine 22 and a database controller 24 that controls and maintains database 18. Source 16 includes, in this example, an encoder 26.

It will be appreciated that encoder 26 can be a separate, non-integral component of the source. Encoder 26 receives live content or presentations in the form of different media streams 17. Encoders 26 can be dedicated media servers, or alternatively other more general-purpose computer systems. These media streams 17 can be individual media streams (e.g., audio, video, graphical, etc.), or alternatively can be composite media streams including two or more of such individual streams. The media streams 17 can be provided to the encoders on a "live" basis from other data source components through dedicated communications channels or through the Internet itself. The encoder can also be a human being who is observing an electronic presentation and rendering meta information about the presentation.

Encoders 26 coordinate the streaming of the live content to other components on the network that request the content or notifications thereof, such as client processing device 12. It is to be appreciated that although the media streams are referred to as being "live", there may be a delay (e.g., between one second and thirty seconds) between the time of the actual event and the time the media streams reach the encoder(s).

There are various standards for streaming media content and composite media streams. "Advanced Streaming Format" (ASF) is an example of such a standard, including both accepted versions of the standard and proposed standards for future adoption. ASF specifies the way in which multimedia content is stored, streamed, and presented by the tools, servers, and clients of various multimedia vendors. ASF provides benefits such as local and network playback, extensible media types, component download, scalable media types, prioritization of streams, multiple language support, environment independence, rich inter-stream relationships, and expandability. Further details about ASF are available from Microsoft Corporation of Redmond, Wash.

Encoders 26 can transmit any type of presentation over the network. This includes the source information that is used by the notification server 14. Examples of such presentations include audio/video presentations (e.g., television broadcasts or presentations from a "NetShow™" server (available from Microsoft Corp. of Redmond, Wash.)), video-only presentations, audio-only presentations, graphical or animated presentations, etc. Registration interface 20 is configured, in this example, to enable collection of both user information and source information. The collected user information is stored in database 18 in a user information database portion 28 that can be designated for holding only user information. The source information is collected and can be stored in database 18 in a live content portion 30. The live content portion 30 holds all of the source information that might be associated with a particular electronic presentation.

Analysis/Search engine 22 performs all of the analysis and searching that is necessary to enable appropriate notifications to be generated and sent to a user. For example, as meta information arrives from one or more of the sources 16, the database 18 is updated and a search is conducted to identify all of the users, if any, who have registered for notifications. If a particular user is found to have registered for a notification when source information of a particular type is detected, then an appropriate notification is generated and sent to the user or client processing device that requested the notification.

Exemplary Client Information Database

Figure 4:
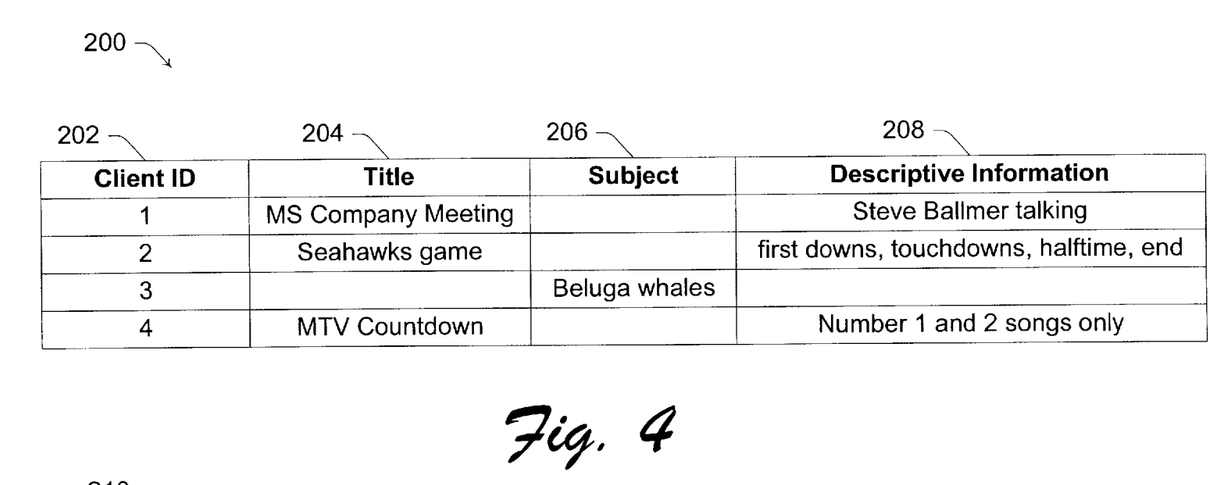
FIG. 4 is a diagram of an exemplary user information database in more detail.

FIG. 4 illustrates entries in an exemplary user information database, such as database 28 (FIG. 3) generally at 200. In the illustrated example, four fields are provided, i.e. a client ID field 202, a title field 204, a subject field 206, and a descriptive information field 208. It is to be understood that this constitutes but one example of possible entries in a user information database. Other entries are, of course, possible.

The user information database enables a user to register for notifications for different electronic presentations that might be broadcast by one or more sources, and/or notifications about particular events that might occur within one or more electronic presentations.

The client ID field 202 holds the identification of each client processing device or user. The identification is used when a notification is to be sent to a user. The identification can be a URL, email address, or any other suitable type of identification that enables notification server 14 to send a notification to a particular client processing device or user. In the present example, there are four users or clients who have registered for notifications. The clients are numbered 1 through 4.

The title field 204 holds a title of the electronic presentation that has been indicated by a user to be of interest. In the present example, clients or users 1, 2 and 4 have registered for notifications regarding specific titled electronic presentations. Specifically, client of user 1 has registered for notifications regarding the Microsoft company meeting; client or user 2 has registered for notifications regarding the Seahawks football game; and client or user 4 has registered for notifications regarding the MTV Countdown of popular songs. Client or user 3 has not registered for any notifications that are associated with a particular titled electronic presentation. A good reason for this is that client or user 3 might not know the title of a specific electronic presentation that contains information of interest, as will become apparent just below.

The subject field 206 holds the subject of an electronic presentation that may be of interest to a user. The subject field gives a user the flexibility to register for notifications for certain subjects while not necessarily requiring the user to know the specific title of the electronic presentation. In the present example, client or user 3 has registered for notifications associated with the subject of an electronic presentation. Client 3 has registered for notifications regarding any electronic presentation that deals with "Beluga whales". The electronic presentations can come from any source. By registering for notifications dealing with a subject and not specifically a titled presentation, client 3 will be notified when Beluga whales is the topic on any of the sources monitored by the notification server.

The descriptive information field 208 holds information that has been specified by a user as being of interest to the user. By entering specific information in the descriptive information field, a user will be notified when the specified events occur within the specified electronic presentation. This can be in addition to an initial notification that the electronic presentation is being broadcast. For example, client or user 1 has registered for notifications regarding the Microsoft company meeting. When the Microsoft company meeting is broadcast, a user or client will typically be notified of the start of the meeting. In addition, client 1 has indicated that they are only interested in notifications when Steve Ballmer is talking. Thus, a notification will be generated to the client or user when Steve Ballmer is talking. Similarly, client 2 has registered for notifications regarding the Seahawks games. Client 2 is only interested, however, in notifications associated with the events described in the Descriptive Information field 208, i.e. first downs, touchdowns, halftime, and end of game. Accordingly, notification server 14 will monitor the meta information that is provided by the source of the Seahawks game and generate an appropriate notification to client or user 2 on the occurrence of the specified events. Client or user 4, while being interested in the MTV Countdown of popular songs, is only interested in the top two songs. Accordingly, client or user 4 has specified information in the Descriptive Information field 208 that will result in notifications only for the number 1 and 2 songs.

Exemplary Live Content Database

Figure 5:
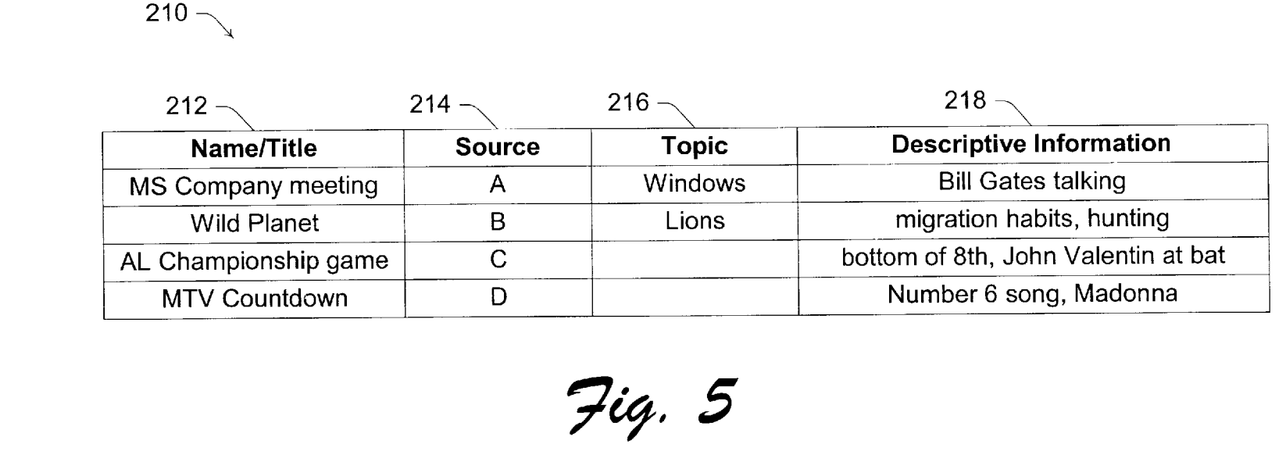
FIG. 5 is a diagram of an exemplary live content database in more detail.

FIG. 5 illustrates entries in an exemplary live content database, such as database 30 (FIG. 3) generally at 210. The live content database 210 maintains current, up-to-the-minute information on electronic presentations that are about to be or are being broadcast by various sources. The live content information that is managed in this database comes from or is associated with all of the many sources that are monitored by the notification server 14. In the illustrated example, four fields are provided, i.e. a name/title field 212, a source field 214, a topic field 216, and a descriptive information field 218. It is to be understood that this constitutes but one example of possible entries in a live content database. Other entries are, of course, possible.

The name/title field 212 includes the name or title of the current electronic presentation that is being broadcast by a source. In the illustrated example, four different sources are being monitored for electronic broadcasts that include the Microsoft company meeting, Wild Planet, the American League Championship game, and the MTV Countdown. As these electronic presentations are being broadcast, meta information is regularly received by the notification server 14 that describes what is taking place during the broadcast. This information is used to continuously update the database so that client notifications can be sent in a timely manner.

The source field 214 identifies the sources from which the electronic presentations can be obtained.

The topic field 216 identifies the current topic of the electronic presentation. For example, the topic currently being discussed at the Microsoft company meeting is "Windows". Similarly, the current topic of the Wild Planet show is "lions".

The descriptive information field 218 includes information that describes the content of the corresponding presentation. This information can include one or more key words describing the presentation. For example, the descriptive information describing the Microsoft company meeting indicates that "Bill Gates is talking". Similarly, the descriptive information for the Wild Planet broadcast indicates that "migration habits" and "hunting" are currently being discussed. The descriptive information can include any information that describes a current broadcast including a summary or abstract of the presentation, or a textual transcript of the presentation.

The data or information for descriptive information field 218 can be generated manually or automatically. Manual generation refers to an individual (e.g., the presentation author) creating the data. For example, the author may write a summary or a list of key words for the presentation and provide them to server 14 (either directly or via an encoder 26).

Automatic generation refers to one of the components, such as an encoder 26 or server 14, using any of a variety of mechanisms to generate data describing the presentation as the presentation occurs. For example, a conventional key word generation process may be employed to identify key words from the presentation. This may be carried out by an encoder 26, server 14, or some other component coupled to the network. By way of another example, closed captioning information may be used as the data, or a conventional speech-to-text conversion process may be used to convert audio data into text data.

The information maintained in the live content database 30 is used by analysis/search engine 22 (FIG. 3) to evaluate and search user information from users of the client processing devices 12 (FIG. 1). A user provides, as part of his or her user information, a set of criteria and which fields the criteria should be applied to. Examples of such criteria were given above in connection with FIG. 4. The user can provide such criteria via any of a wide variety of conventional input mechanisms, such as a graphical user interface (GUI), an example of which is discussed below. In the illustrated example, the user is able to search any of the fields in live content database 30. Analysis/search engine 22 compares the user-provided criteria to each entry (entries 212-218) in the database 30, or vice versa, to determine whether the electronic presentation corresponding to the entry satisfies the user criteria. Any of a variety of conventional searching algorithms and methodologies can be used. For example, any entry with at least one word matching one of the user criteria may satisfy the search request, or, an entry may be required to include every word in the search criteria in order to satisfy the search request, etc.

Information regarding electronic presentations that satisfies any of the user-specified criteria is provided to the client processing device 12 of the user that placed the request. Such information may be the entire entry from database 30 (e.g. one or more of the row entries of FIG. 5), or alternatively, a selected portion (e.g., the title field 212 and source field 214 for the entry). The source field 214 is provided to the client processing device to allow the user to subsequently request the presentation, for example via the client processing device, from the appropriate source or encoder. In the illustrated example, the data in source field 214 can comprise a uniform resource locator (URL) that identifies a particular presentation available from a particular encoder. A user can accordingly click a link to the URL and be automatically connected to the presentation.

Information from each entry that satisfies the user criteria is provided to the user and, if multiple entries satisfy each criteria, then the user can select one or more presentations based on this information. Alternatively, server 14 may rank the entries based on how well they match the user criteria and return information for only the highest ranking entry (or entries) to the user.

In Operation

Figure 6:
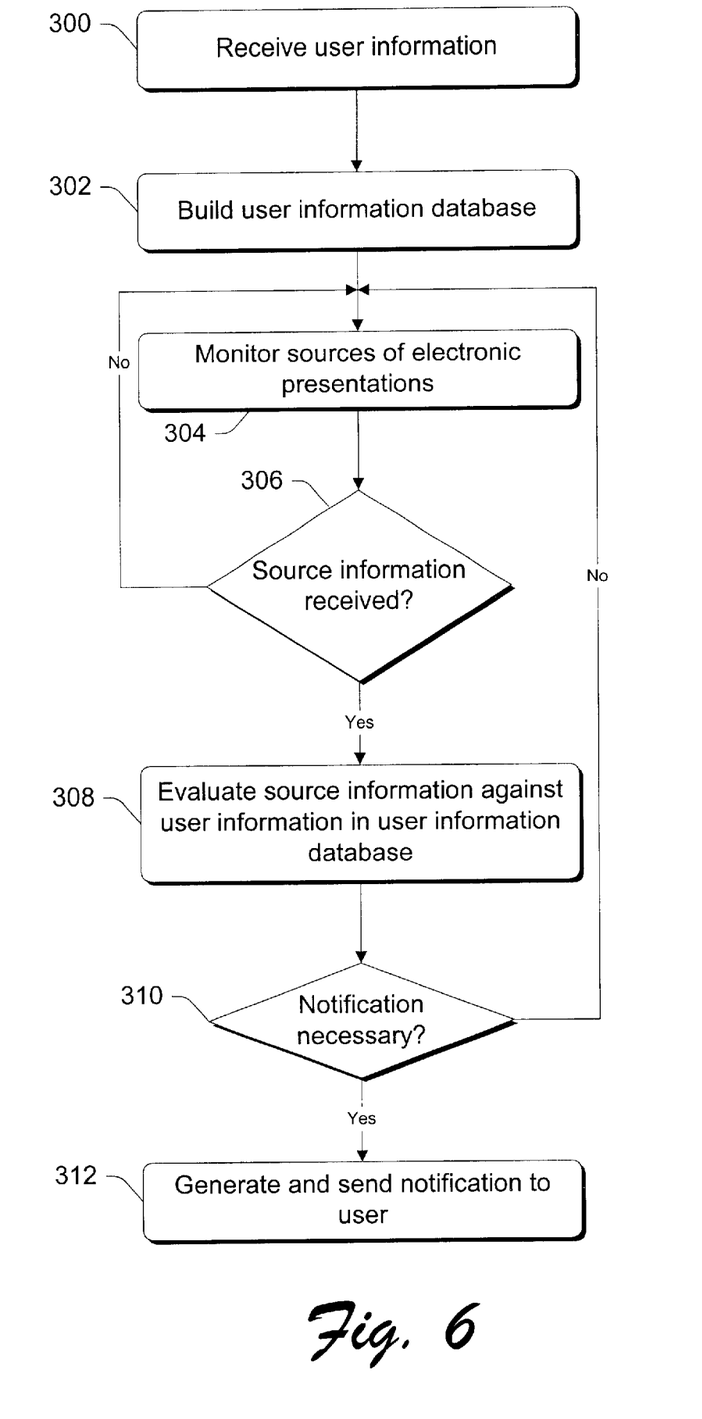
FIG. 6 is a flow diagram that describes steps in a method in accordance with one embodiment of the invention.

FIG. 6 shows a flow diagram that describes steps in a notification method in accordance with the described embodiment. Step 300 receives user information from one or more users. The user information gives an indication of electronic presentations that might be of particular interest to a user. The user information can be collected in any number of ways. For example, users can interface with a suitable notification server 14 (FIG. 1) using a client processing device. With the client processing device, a user can enter various criteria upon which notifications are to take place. Alternately, there might be a database that maintains a collection of information about particular users, e.g. user occupation, geographical location, user viewing habits, that form the criteria upon which notifications take place. Step 302 uses the user information to build a user information database 28 (FIG. 3).

Step 304 monitors one or more sources of electronic presentations. Monitoring can take place in any suitable way. In the described embodiment, monitoring takes place through the use of a network, such as the Internet, that connects the sources and one or more notifications servers together. In the illustrated example, source information is developed pertaining to the electronic presentations that are currently being broadcast (or are about to be broadcast) by the sources. The source information can be received directly from a source or, alternately, from an encoder that is associated with a source. Examples of the various types of source information that can be received are given above.

Step 306 determines whether any source information is received. In the described example, source information can be received when a broadcast is about to begin, as well as throughout the broadcast itself. The source information that is received during the source's broadcast of an electronic presentation can describe various events that can occur within a particular presentation. Examples of such events were given above in connection with FIG. 5. When source information is received, step 308 evaluates the source information against the user information. The source information can, for example, be compared against the user information to determine whether any of the users need to be notified regarding one or more of the electronic presentations. If, as a result of the evaluation of step 308, it appears that one or more users need to be notified (step 310), then step 312 generates and sends an appropriate notification. Any suitable notifications can be used. The notifications contain an indication that a particular electronic presentation that is being broadcast might contain information of interest to the client. For example, a small icon or flashing bulb might pop up on a client processing device. Additionally, notifications can be sent via email, facsimile or pager to name just a few. The function of the notification is to attempt to inform a user that an electronic presentation has been found that might be of potential interest to the user. In one aspect of the invention, and in the event that a user does not receive the notification or, has opted to record a particular presentation, an electronic presentation that is the subject of a notification can be automatically recorded for a user for subsequent viewing.

In this way, information that is generated before, during and concerning various electronic presentations from a number of different sources can be monitored. The generated information is processed to determine whether any of a number of different users would be interested in viewing at least a portion of a particular electronic presentation. In the described embodiment, the generated information is processed by one or more notification servers 14 that compare the generated information with user information provided by one or more users. The information concerning the various electronic presentations can be periodically updated and subsequently used to search the user information. Thus, users can be continuously updated on a number of different electronic presentations without having to physically connect to the sources of the electronic presentations for continuous play. This is advantageous and constitutes a much desired improvement over previous systems and methods for a number of reasons. First, a user can monitor many different electronic presentations on various media (e.g. television, client/server computer system etc.) without having to physically view each or any of them. This means that users have a much greater breadth in the number of shows that can be monitored. In addition, once the user information database is established, a user can go about their business and forget that they have even registered for notifications. The notifications are automatically generated and sent to the user thereby alleviating the monitoring burden from the user. Furthermore, the granularity at which the notifications are generated are at a level that the user can truly isolate events of interest and be notified only when those events occur, e.g. events within a particular electronic presentation. Other advantages will be apparent to those of skill in the art.

User Interfaces

In one implementation, one or more user interfaces are provided and advantageously interface with a user. The user interfaces are configured to allow a user to both provide user information to the notification server, and to allow the notification server to provide information, such as monitored source information, to a user or client processing device. The information exchange protocol that is employed can comprise any suitable protocol that is capable of establishing communication and information exchange between the client processing devices 12 and the notification server(s) 14. One protocol that has been particularly useful in the context of a network such as the Internet is one based upon Extensible Markup Language (XML). Extensible Markup Language (XML) is a meta-markup language that provides a format for describing structured data. XML is similar to HTML in that it is a tag-based language. XML is a derivative of Standard Generalized Markup Language (SGML) that provides a uniform method for describing and exchanging structured data in an open, text-based format. XML utilizes the concepts of elements and namespaces. Compared to HTML, which is a display-oriented markup language, XML is a general-purpose language used to represent structured data without including information that describes how to format the data for display. More recently, XML has emerged as a desired protocol for communication between client/server systems.

Figure 7:
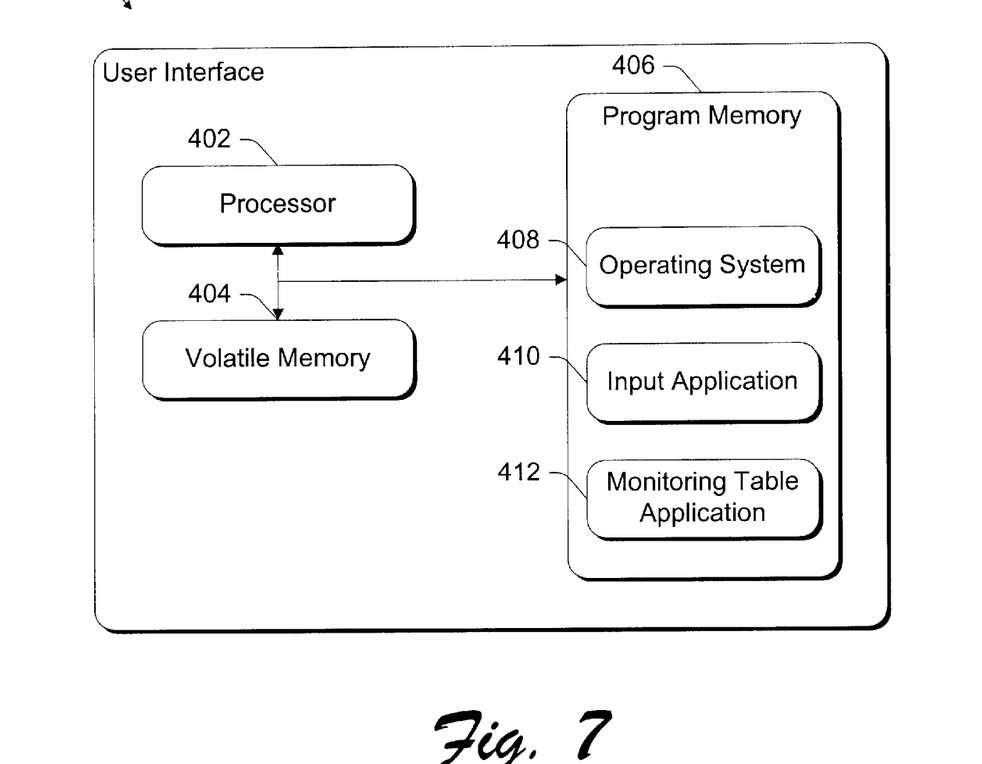
FIG. 7 is a block diagram of an exemplary user interface in accordance with one embodiment of the invention.

FIG. 7 shows an exemplary user interface unit generally at 400. User interface unit 400 can comprise an integral part of a client processing device 12, or can be separate from the client processing device. The illustrated interface unit 400 includes a processor 402, volatile memory 404, and program memory 406. The user interface unit has a receiver (not shown) for receiving source information from the notification server 14. That is, as the notification server evaluates the source information that it receives, it generates, when appropriate, notifications for the various client processing devices. When the server sends the notifications, the notifications can be received by the user interface unit and rendered into a display for the user to view. In one implementation, the client processing device runs an operating system 408 which supports multiple applications. The operating system 408 is stored in memory and executes on the processor 402. The operating system can advantageously be a multitasking operating system which allows simultaneous execution of multiple applications. The operating system 408 employs a graphical user interface windowing environment which presents the applications or documents in specially delineated areas of a display screen called "windows." One exemplary operating system is a Windows® brand operating system sold by Microsoft Corporation, such as Windows® 95 or Windows® NT or other derivative versions of Windows®. However, other operating systems which provide windowing environments can be employed, such as the Macintosh operating system from Apple Computer, Inc. and the OS/2 operating system from IBM.

Registration Interface

An input application 410 is stored in the program memory 406 and executes on the processor to render a user display or registration interface that enables a user to input information of interest that can be used by the notification server 14 to build and maintain its user information database 28. This information can also be used by the notification server to conduct the appropriate searches when it receives the source information as described above. It will be appreciated that the input application 410 may also be a monitoring application that monitors a user's viewing habits and provides information to the notification server pertaining the viewing habits. This can allow the notification server to maintain statistics on a user's viewing habits so that the user can be notified, when appropriate, of electronic presentations that conform to their established viewing habits.

Figure 8:
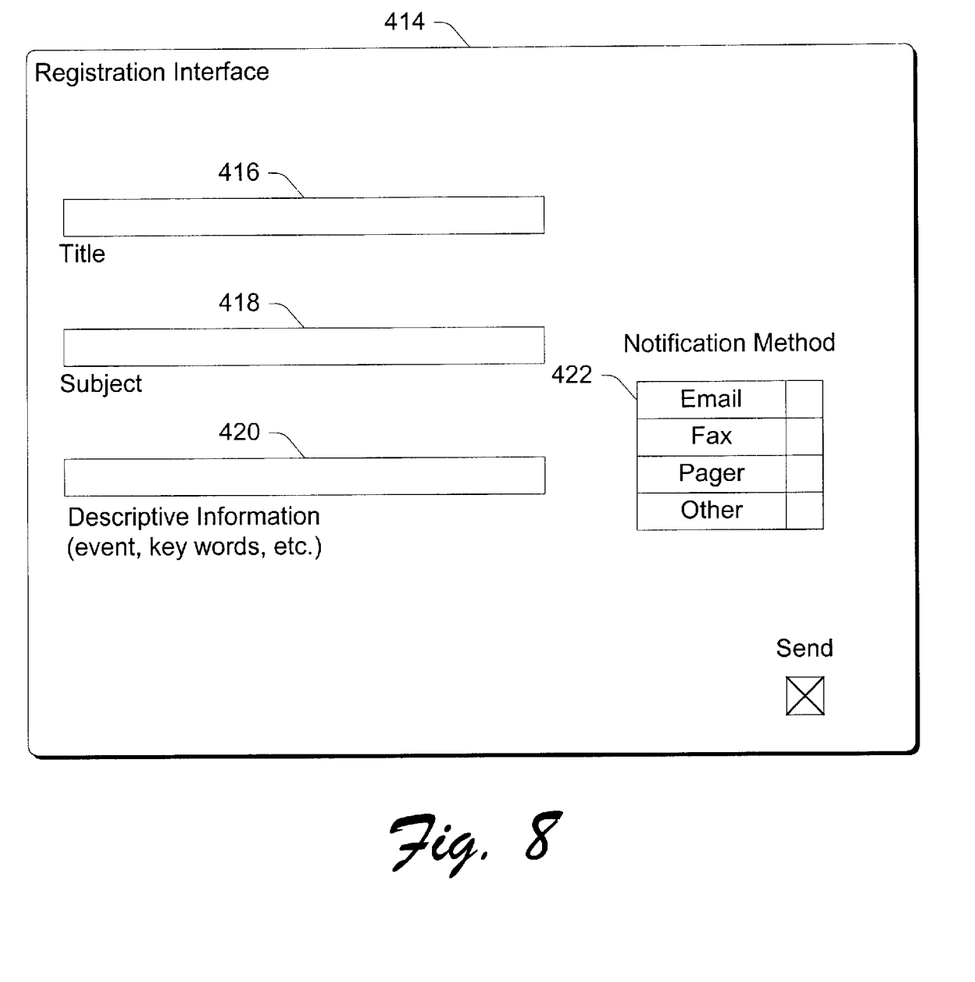
FIG. 8 is a diagram of a display that can be rendered on a client processing device using the user interface of FIG. 7.

FIG. 8 shows an exemplary registration interface 414 that can be rendered by input application 410 and displayed on a client processing device 12. The interface 414 presents a number of different selection fields that enable a user to select one or more electronic presentations for which monitoring will take place. In the illustrated example, the selection fields include a title field 416, a subject field 418, and a descriptive information field 420. Other fields are possible. These fields allow a user to enter information that pertains to electronic presentations in which they might be interested. For example, a user can enter a title of a particular program in the title field 416. Alternately or in addition, a user can enter a subject in the subject field 418. Alternately or in addition, a user can enter descriptive information in the descriptive information field 420. This information corresponds to the fields that are defined for the client information database discussed above in connection with FIG. 4.

A notification method field 422 can also be provided to give the user the ability to select the type of notification that they are to receive. In the illustrated example, there are four types of notification that the user can select, i.e. email, fax, pager, and other. These selections can reference additional fields so that the appropriate information can be entered by the user. Once all of the information has been entered by a user, they can simply click the "send" button which sends the information to the notification server 14. In one implementation, the client information is bundled up as an XML data packet that it sent to and processed by the notification server 14. The notification server can then go about the process of entering the information into the user information database (FIGS. 3 and 4).

Monitoring Interface

When all of the user information has been collected and stored for a particular user, the notification server 14 can then begin to monitor the source information for the particular electronic presentations that have been specified by the user. When the notification server 14 detects an electronic presentation that fits with user-registered information, it generates and sends a notification to the appropriate client processing device or user. The client processing device or user interface can then take the notification and render it into information that is displayed for the user.

FIG. 7 shows a monitoring table application 412 stored in the program memory 306. The monitoring table application executes on the processor to control the information that is ultimately displayed for a user on their client processing device. The information that is displayed gives indicia that is associated with electronic presentations that have been selected by a user and that are currently being broadcast by a source. The monitoring application 412 enables indicia to be displayed for a user without requiring that the selected electronic presentations be continuously played for the user. In this way, selected electronic presentations are automatically monitored and notifications are generated, when appropriate, when certain presentations or portions thereof are broadcast. The monitoring application 412 can interface with other applications in order to receive and manage the information that is to be displayed for the user. These other applications can be stored in the program memory 406 and can include various text, graphics, and image-capturing applications to name just a few.

Figure 9:
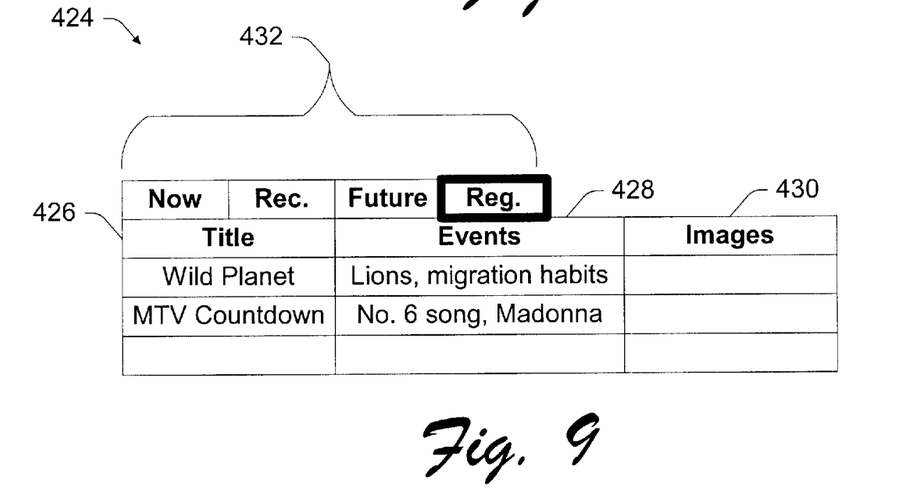
FIG. 9 is a diagram of another display that can be rendered on a client processing device using the user interface of FIG. 7.

FIG. 9 shows an exemplary monitoring table interface 424 that can be rendered by monitoring table application 412 and displayed on a client processing device 12. The monitoring table interface 424 presents a number of fields that enable a user to be informed on the status of electronic presentations for which they have registered for notification. In the illustrated example, a title field 426 holds the title of one or more electronic presentations for which a user has registered. An events field 428 holds indicia of events that can occur within one or more of the electronic presentations. This indicia can be textual, graphic, audio and/or visual to name just a few. An image field 430 is provided for holding captured images of an event that can occur within one or more of the electronic presentations. For example, an encoder can take a picture of a particular event and form a JPEG image of the picture. The JPEG image can then be pushed to the notification server which, in turn, can provide the image to those clients that have registered for a presentation that is associated with the image. The JPEG image can be displayed in the image field 430 so that a user can keep updated on the status of the presentation without being physically connected to the source of the presentation for continuous viewing.

In addition, a number of tabs 432 are provided and enable a user to click through various information displays. In the illustrated example, four such tabs are provided and include a "Now" tab, a "Rec." tab (for "Recorded"), a "Future" tab, and a "Reg." tab (for "Registered"). The "Now" tab enables a user to access what is currently being monitored by the notification server 14. This might include all of the electronic presentations that are being monitored, in addition to the ones that are the subject of the current user's registrations. The "Rec." tab allows a user to access a list of electronic presentations that might have been recorded for the user. For example, if a user notification is sent to a user, but is not acknowledged, the user may have set a default "record" setting that provides for the presentation to be recorded for future viewing. The "Future" tab allows a user to access a list of presentations/events that have been registered for by the user for some time in the future. The user can then be given the opportunity to edit their choices such as by unregistering for certain presentations or events, or by changing the parameters associated with one or more presentation or event. The "Reg." tab allows a user to access a list of presentations and events that they are currently registered for, and which are currently being broadcast. In the present example, two presentations for which the user has registered are currently being broadcast, i.e. Wild Planet and MTV Countdown. In the case of the Wild Planet presentation, the current event is "lions" and their migration habits. Recall that in the FIG. 4 example, the user registered for notification in such an instance where Beluga whales were the topic of the Wild Planet presentation. In this instance, no notification would be generated and sent to the user by the notification server 14. With respect to the MTV Countdown presentation, the "event" field indicates that the countdown is currently on the No. 6 song and that Madonna is artist. When the countdown reaches the number 2 song, a notification will be generated and sent by the notification server to the user. This can be the case even though the user may have their user interface 424 pulled up.

Various aspects of the invention provide an interactive, robust user tool that enables a user to register for notifications pertaining to many different electronic presentations that can originate from many different sources. Users can adjust the granularity at which the notifications occur by registering for certain events that might occur during an electronic presentation. Novel use of real time meta information (source information) is made to enable various electronic presentations to be monitored live or in real time so that timely notifications can be sent to those users who have registered for certain events. Users can thus have many different electronic presentations monitored without having to physically connect to the sources for continuous play. Source information can include information that is pulled from various sources or information that is pushed from various sources.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A notification method for notifying a plurality of users regarding an electronic presentation, comprising:
   receiving source information from at least one source of an electronic presentation, the source information describing one or more aspects of the electronic presentation as it is being or is about to be broadcast by the source;
   evaluating the source information against user information that gives an indication of electronic presentations that might be of particular interest to a particular user; and
   generating a notification to one or more users if, as a result of an evaluation of the source information against the user information, it appears that the one or more users would be interested in an electronic presentation.

2. The notification method of claim 1, wherein said receiving of the source information comprises receiving source information from a plurality of sources during their respective broadcasts of their electronic presentations.

3. The notification method of claim 1, wherein said receiving of the source information comprises receiving source information that pertains to one or more events that occur within a particular electronic presentation for the one source.

4. The notification method of claim 1, wherein said receiving of the source information comprises receiving source information from a plurality of sources during their respective broadcasts of their electronic presentations, said source information pertaining to one or more events that occur within a particular respective electronic presentation for at least some of the sources.

5. The notification method of claim 1, wherein the user information includes topical information for at least one of the users regarding one or more topics of interest to the one user.

6. The notification method of claim 1, wherein the user information includes one or more key words.

7. The notification method of claim 1 further comprising recording one or more electronic presentations for one or more of the users, in the event that a user is unable to view a particular electronic presentation.

8. The notification method of claim 1 further comprising acquiring user information by monitoring user viewing habits.

9. The notification method of claim 1, wherein at least one of the electronic presentations comprises a multimedia presentation.

10. The notification method of claim 1, wherein at least one of the electronic presentations comprises an audio/video streaming media presentation.

11. One or more computer-readable media having computer-executable instructions thereon which, when executed by a computer, perform the method recited in claim 1.

12. A server having programmed instructions which, when executed by the server, implement the method of claim 1.

13. A notification method for notifying a user regarding one or more electronic presentations, comprising:
   receiving user information from one or more users, the user information giving an indication of electronic presentations that might be of particular interest to a user;
   monitoring source information from one or more sources of electronic presentations, the source information describing one or more aspects of a source's electronic presentation, at least some of said monitoring taking place during broadcast of an electronic presentation for the source; and
   generating a notification to one or more users that contains an indication that a particular electronic presentation that is being broadcast might contain information of interest to the user.

14. The notification method of claim 13, wherein said receiving of the user information comprises receiving user information that pertains to one or more events that can occur within a particular electronic presentation by one or more of the sources.

15. The notification method of claim 13 further comprising receiving source information from one or more different sources, the source a information pertaining to electronic presentations associated with each of the sources.

16. The notification method of claim 15, wherein said receiving of the source information comprises receiving updated information during a broadcast of an electronic presentation by at least one of the sources.

17. The notification method of claim 15, wherein said receiving of the source information comprises receiving updated information during a broadcast of an electronic presentation by all of the sources.

18. The notification method of claim 15, wherein said receiving of the source information comprises receiving information that relates to one or more events that can occur within a particular electronic presentation for one or more of the sources.

19. The notification method of claim 15 further comprising, for at least one of the sources, manually generating the source information during broadcast of a particular electronic presentation.

20. The notification method of claim 15 further comprising, for at least one of the sources, generating the source information during broadcast of a particular electronic presentation.

21. The notification method of claim 15, wherein said receiving of the source information comprises, for at least one of the sources, periodically receiving source information regarding an electronic presentation that is currently being broadcast, without connecting to the one source for continuous play of the electronic presentation.

22. The notification method of claim 15, wherein said receiving of the source information comprises pulling the information from at least one of the sources.

23. The notification method of claim 15, wherein said receiving of the source information comprises receiving information that is pushed from at least one of the sources.

24. The notification method of claim 13, wherein the one or more electronic presentations comprise multimedia presentations.

25. The notification method of claim 13, wherein the one or more electronic presentations comprise audio/video streaming media presentations.

26. One or more computer-readable media having computer executable instructions thereon which, when executed by a computer, perform the method of claim 13.

27. A server having programmed instructions which, when executed by the server, implement the method of claim 13.

28. A monitoring method for monitoring broadcasts of electronic presentations comprising:
 generating information during and concerning electronic presentations from a plurality of different sources, said information being associated with content of the presentations; and
 processing generated information to determine whether any of a plurality of users would be interested in viewing at least a portion of a particular electronic presentation.

29. The monitoring method of claim 28, wherein said generating comprises manually generating the information.

30. The monitoring method of claim 28, wherein said generating comprises automatically generating the information.

31. The monitoring method of claim 28, wherein the electronic presentations comprise multimedia presentations.

32. The monitoring method of claim 28, wherein the electronic presentations comprise audio/visual streaming presentations.

33. The monitoring method of claim 28, wherein said processing comprises comparing the generated information with user information provided by one or more users that pertains to presentations that might be of particular interest to a user.

34. The monitoring method of claim 28, wherein said generating comprises periodically updating the generated information during the electronic presentations.

35. At least one encoder and at least one server collectively configured and communicatively linked to implement the method of claim 28, said at least one encoder being programmed to generate the information, said at least one server being programmed to process the generated information.

36. One or more computer-readable media having instructions thereon which, when executed by a computer, perform the method of claim 28.

37. A registration and notification method for registering for notifications concerning one or more electronic presentations, comprising:
 receiving user information from a user, the user information describing at least one of a subject of an electronic presentation or an event that can occur during an electronic presentation that might be broadcast at some time in the future;
 receiving source information from a plurality of different sources of electronic presentations;
 evaluating the source information to determine whether any of the electronic presentations contain a subject or an event that has been specified by a user; and
 in the event that the source information does contain a subject or an event that has been specified by a user, generating and sending a notification to that user.

38. The registration and notification method of claim 37, wherein said receiving of the source information comprises receiving the source information during broadcast of an electronic presentation for at least one of the sources.

39. A server programmed with instructions which, when implemented, perform the method of claim 37.

40. One or more computer-readable media having computer-readable instructions thereon which, when executed by a computer, cause the computer to implement the method of claim 37.

41. A notification system comprising:
 one or more client processing devices configured to generate user information that gives an indication of electronic presentations that might be of particular interest to a particular user, the client processing device being capable of displaying electronic presentations;
 one or more sources of electronic presentations;
 at least one notification server in communication with the one or more client processing devices and the one or more sources of the electronic presentations, the notification server being configured to:
  receive source information from at least one of the sources during its electronic presentation, the source information pertaining to the electronic presentation of the source;
  evaluate the source information against user information that gives an indication of electronic presentations that might be of particular interest to a user; and
  generate a user notification to one or more of the users, the user notification containing an indication that a particular electronic presentation that is being broadcast might contain information that is of interest to the user.

42. The notification system of claim 41, wherein the notification server is configured to receive the user information.

43. The notification system of claim 41, wherein the notification server is configured to receive source information that pertains to one or more events that occur within a particular electronic presentation.

44. The notification system of claim 41, wherein the notification server is configured to receive updated source information that is generated during a source's electronic presentation.

45. The notification system of claim 41, wherein the user information includes topical information for at least one of the users regarding one or more topics of interest to the one user.

46. The notification system of claim 41, wherein the user information comprises search parameters, the notification server being configured to evaluate the source information by comparing the source information with the search parameters.

47. The notification system of claim 41, wherein the notification server is configured to acquire user information by monitoring user viewing habits.

48. The notification system of claim 41, wherein at least one of the electronic presentations comprises a multimedia presentation.

49. The notification system of claim 41, wherein at least one of the electronic presentations comprises an audio/video streaming media presentation.

50. The notification system of claim 41, wherein at least one of the client processing devices comprises a computer.

51. The notification system of claim 41, wherein at least one of the client processing devices comprises a television.

52. A computer program stored on one or more computer-readable storage media for notifying one or more users of electronic presentations that might be of particular interest to the users, the program comprising the following steps:

receiving source information from at least one source of an electronic presentation during its electronic presentation, the source information pertaining to the electronic presentation of the source;

evaluating the source information against user information that gives an indication of electronic presentations that might be of particular interest to a user; and generating a user notification to one or more of the users, the user notification containing an indication that a particular electronic presentation that is being broadcast might contain information that is of interest to the user.

53. A notification server comprising:

a memory;

executable instructions in the memory which, when executed by the server cause the server to:

receive source information from a source of an electronic presentation, the source information being received during the source's broadcast of the electronic presentation, said source information being associated with content of the presentation; and evaluate the source information to determine whether any of a number of users interested in viewing the electronic presentation.

54. The notification server of claim 53, wherein the executable instructions, when executed by the server, cause the server to generate a user notification in the event that a user might be interested in viewing the electronic presentation.

55. The notification server of claim 53, wherein the executable instructions, when executed by the server, cause the server to generate indicia that can be displayed by a client processing device and which is indicative of an electronic presentation.

56. A user interface for use in an interactive entertainment system comprising:

a processor;

a monitoring table executing on the processor and having one or more fields that display indicia associated with selected electronic presentations that are currently being broadcasted and monitored in accordance with user-provided information that governs which electronic presentations are to be monitored for the user; and an input device operable to enable a user to select a particular electronic presentation for continuous play viewing.

57. The user interface of claim 56, wherein the selected presentations are being monitored without being continuously played for the user.

58. The user interface of claim 56, wherein one of the fields is a title field for holding the title of one or more electronic presentations.

59. The user interface of claim 56, wherein one of the fields is an event field for holding indicia of events that can occur within one or more of the electronic presentations.

60. The user interface of claim 56, wherein one of the fields is an image field for holding a captured image of an event that can occur within one or more of the electronic presentations.

61. A user interface for use in an interactive entertainment system comprising:

a processor; and an application executing on the processor and configured to present a selection field for enabling a user to select one or more electronic presentations that will subsequently be monitored when broadcast, but which will not be continuously played for a user unless selected by the user, the selection field being configured to enable the user to enter user information that is evaluated against meta information associated with content of the one or more electronic presentations to identify electronic presentations that might be of interest to the user.

62. The user interface of claim 61, wherein the application is further configured to present an event field for enabling a user to select one or more events that can occur and be monitored for within an electronic presentation.

* * * * *

UNITED STATES PATENT AND TRADEMARK OFFICE
CERTIFICATE OF CORRECTION

PATENT NO. : 6,694,352 B1  Page 1 of 1
DATED : February 17, 2004
INVENTOR(S) : Omoigui

It is certified that error appears in the above-identified patent and that said Letters Patent is hereby corrected as shown below:

Column 7,
Line 40, replace "from a "NetShow"™ server" to -- from a server enabled with the "NETSHOW®" software --.

Column 16,
Line 43, delete "a" between "source" and "information".

Signed and Sealed this

Fifteenth Day of June, 2004

JON W. DUDAS
*Acting Director of the United States Patent and Trademark Office*